`US010640958B2`

(12) United States Patent
Paternoster et al.

(10) Patent No.: US 10,640,958 B2
(45) Date of Patent: May 5, 2020

(54) SANITARY BASIN MOULDED PART

(71) Applicant: SCHOCK GMBH, Regen (DE)

(72) Inventors: Rudolf Paternoster, Rinchnach (DE); Josef Preuss, Zwiesel (DE)

(73) Assignee: SCHOCK GMBH, Regen (DE)

( * ) Notice: Subject to any disclaimer, the term of this patent is extended or adjusted under 35 U.S.C. 154(b) by 0 days.

(21) Appl. No.: 16/237,811

(22) Filed: Jan. 2, 2019

(65) Prior Publication Data

US 2019/0136493 A1 May 9, 2019

Related U.S. Application Data

(62) Division of application No. 15/032,697, filed as application No. PCT/EP2014/002575 on Sep. 23, 2014, now Pat. No. 10,214,886.

(30) Foreign Application Priority Data

Nov. 15, 2013 (DE) ........................ 10 2013 019 536

(51) Int. Cl.
| | |
|---|---|
| *E03C 1/18* | (2006.01) |
| *B29C 70/02* | (2006.01) |
| *B29C 63/02* | (2006.01) |
| *B29C 63/00* | (2006.01) |
| *B29C 39/10* | (2006.01) |
| *B29L 31/00* | (2006.01) |

(52) U.S. Cl.
CPC ............... *E03C 1/18* (2013.01); *B29C 39/10* (2013.01); *B29C 63/0021* (2013.01); *B29C 63/02* (2013.01); *B29C 70/02* (2013.01); *B29L 2031/769* (2013.01); *B29L 2031/7696* (2013.01); *B29L 2031/7698* (2013.01)

(58) Field of Classification Search
CPC .................................. B29C 39/10; E03C 1/18
USPC .................................. 4/619; 156/307.1–307.7
See application file for complete search history.

(56) References Cited

U.S. PATENT DOCUMENTS

| | | | |
|---|---|---|---|
| 4,126,719 | A | 11/1978 | Koyanagi |
| 5,218,013 | A | 6/1993 | Schock |
| 5,601,680 | A | 2/1997 | Kaszaj |
| 2005/0080184 | A1 | 4/2005 | Hajek et al. |
| 2007/0225443 | A1 | 9/2007 | Skelskey |

(Continued)

FOREIGN PATENT DOCUMENTS

| | | |
|---|---|---|
| AT | 327 568 | 2/1976 |
| DE | 28 23 017 | 12/1978 |

(Continued)

OTHER PUBLICATIONS

Canadian Office Action dated May 22, 2019 in parallel Canadian Patent Application No. 2,930,341.

(Continued)

*Primary Examiner* — Lori L Baker
(74) *Attorney, Agent, or Firm* — Wenderoth, Lind & Ponack, L.L.P.

(57) ABSTRACT

A sanitary basin molded part, for example a kitchen sink, a washbasin or a shower tray, has a main part (10) that has the shape of the sanitary basin molded part and ensures its mechanical stability. On the visible side of the sanitary basin molded part a covering layer (20) is arranged in at least one surface region on top of the main part (10). The covering layer includes a fibrous tissue (24) saturated with a cured binding agent. A method produces a sanitary basin molded part of this kind.

14 Claims, 1 Drawing Sheet

(56) References Cited

U.S. PATENT DOCUMENTS

2012/0043013 A1    2/2012   Chun
2013/0231017 A1    9/2013   Schmidt

FOREIGN PATENT DOCUMENTS

| | | |
|---|---|---|
| DE | 37 07 949 | 9/1988 |
| DE | 37 12 959 | 8/1989 |
| DE | 690 31 130 | 3/1998 |
| DE | 10 2004 055 365 | 5/2006 |
| DE | 601 19 500 | 11/2006 |
| EP | 0 229 262 | 7/1987 |
| EP | 0 361 101 | 4/1990 |
| JP | 06143449 | 5/1994 |
| JP | 11-123735 | 5/1999 |
| JP | 2000-218722 | 8/2000 |
| JP | 2008-285917 | 11/2008 |
| RU | 2024130 | 11/1994 |

OTHER PUBLICATIONS

International Search Report (ISR) dated Jan. 23, 2015 in International (PCT) Application No. PCT/EP2014/002575.
Kiryuhin S. M. and Shustov Y.S, "Textual Material Science".

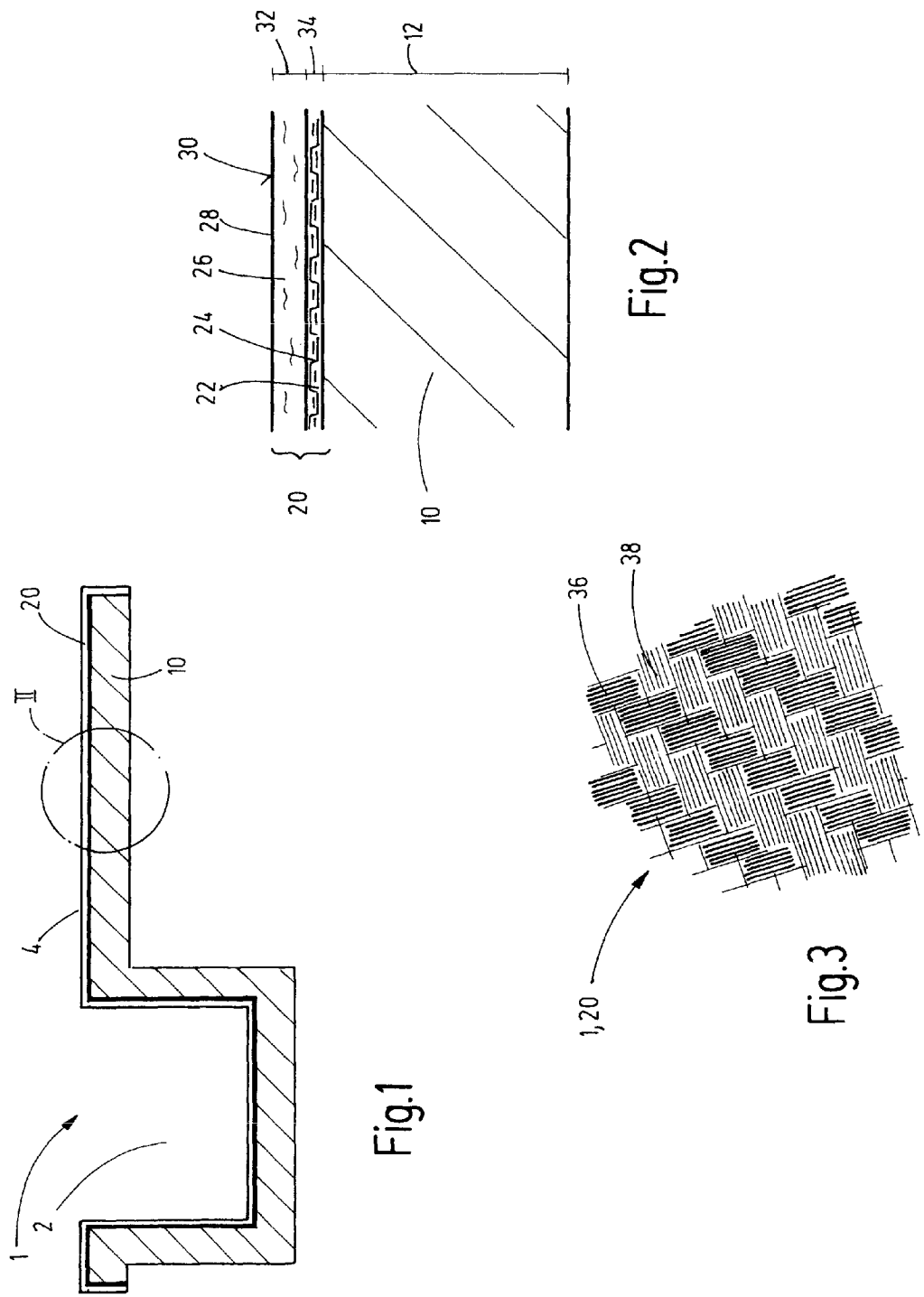

SANITARY BASIN MOULDED PART

CROSS-REFERENCE TO RELATED APPLICATION

This application is a divisional of U.S. patent application Ser. No. 15/032,697, filed Apr. 28, 2016, the entire subject matter of which is hereby incorporated by reference.

FIELD OF THE INVENTION

The invention relates to a sanitary basin molded part, for example, a kitchen sink, a wash basin or a shower tray, and a method for manufacturing a sanitary basin molded part.

BACKGROUND OF THE INVENTION

A basin molded part is known from DE 10 2004 055 365 A1. An associated manufacturing method using a molded part suitable, for example, for kitchen sinks is known from EP 0 361 101 B1. Basin molded parts manufactured in this way have a high visual quality, as well as very good functional properties, in particular, a high resistance to abrasion and a visual appearance with high long-term stability.

Basin molded parts that have large-volume and/or that deviate from a surface profile, extending three-dimensionally, such as, for example, a kitchen sink, may have a mass of, for example, greater than 10 kg, in particular, if they are manufactured from a polymerized, cured binder embedded with fillers, as is described, for example, in EP 0 361 101 B1. As a result, precautions must be taken against breakage, in particular, during transport and assembly of the basin molded parts, which transport and assembly requires corresponding effort and makes handling complicated.

In addition, though the surface of the manufactured sanitary basin molded parts is of extraordinary high quality, the sanitary basin molded parts are severely stressed over the course of years or decades of use, not only mechanically, for example, as a result of abrasion, scratches and impacts, but also as a result of hot/cold stresses, for example, as a result of hot dishwater or as a result of cookware stored while still hot. Care must be taken, in particular, in the case of sanitary basin molded parts manufactured from a composite material, not to allow stress cracks to occur on the surface. Avoiding stress cracks can be ensured only through the use of high-grade resins and a complex process control.

SUMMARY OF THE INVENTION

An invention is to provide an improved sanitary basin molded part and an associated manufacturing method with which the functional properties of the sanitary basin molded parts are further improved, and which provide, in particular, an especially attractive surface appearance.

This object is basically achieved by the sanitary basin molded part and by the manufacturing method where a covering layer of a fiber fabric impregnated with a cured binding agent is provided on a visible side of a sanitary basin molded part.

In one embodiment, the invention relates to a sanitary basin molded part, such as, for example, a kitchen sink, a wash basin or a shower tray, having a main body in the shape of the sanitary basin molded part and providing the mechanical stability of the sanitary basin molded part, wherein on the visible side, which forms the functional surface of the sanitary basin molded part when in use, the covering layer comprising the fiber fabric impregnated with a cured binding agent is disposed in at least one surface area on top of the main body.

The main body may be manufactured, for example, from a composite material comprising a polymerized, cured binding agent and embedded with fillers, as is described in EP 0 361 101 B1 or in DE 10 2004 055 365 A1. The main body, by itself, may, in particular, be a basin molded part, which is a saleable product even without the covering layer according to the invention. Alternatively, the main body may also have a somewhat lower thickness as compared to a saleable basin molded part and/or a lower surface quality on the visible side which, in the sanitary basin molded part according to the invention, is formed by the covering layer to be applied in addition.

The composite material of the main body may, for example, be formed from a cured resin, in particular, an acrylic resin, embedded with preferably particulate, non-organic fillers, for example, sand or quartz. The proportion of filler is preferably between 55% and 85% by weight, in particular, between 60% and 80% by weight, and preferably between 65% and 75% by weight, in each case relative to the total mass of the main body. The size of the filler particles may be selected, for example, as described in EP 0 361 101 B1 or DE 10 2004 055 365 A1.

In one embodiment, the covering layer on the visible side of the sanitary basin molded part covers the entire surface of the main body. In addition, the covering layer may also be applied laterally to the edges of the sanitary basin molded part, so that once the sanitary basin molded part is installed, the entire visible surface of the sanitary basin molded part is formed by the covering layer.

In one embodiment, the covering layer has a thickness of less than 35%, in particular, less than 30% and preferably less than 25% of the thickness of the main body. For example, the main body may have a thickness of 10 mm, whereas the covering layer has a thickness of merely 1.5 mm. In spite of the relatively lower percentage thickness of the covering layer, the fibers disposed therein, which are oriented in the manner of a fabric and preferably perpendicular to one another, ensures stabilization of the top layer of the covering layer disposed above the fiber fabric and made, for example, of a resin, in particular against stress cracks due to stresses from heat/cold. The top layer may be formed, for example, from a preferably highly transparent, alternatively also tinted polyester resin, or, alternatively, from an epoxy resin preferably with a water-repellant surface layer.

As a result of the fiber fabric disposed in the covering layer, the top layer disposed in the direction of the surface of the sanitary basin molded part on top of the fiber fabric is stabilized, thereby achieving a high stability of the surface of the sanitary basin molded part formed by the covering layer, in particular, against stress cracks due to stress from heat/cold. In one embodiment, compressive stresses are present at room temperatures in the covering layer, in particular, in the top layer, which reliably prevent the occurrence of stress cracks.

While the rigidity of the sanitary basin molded part is already provided by the main body, the covering layer allows for additional stabilization of the surface and for enhanced impact resistance when impacts occur, for example, as a result of falling kitchen utensils. In addition, situating a covering layer on the main body provides additional possibilities for designing the outward visual appearance of the sanitary basin molded part. By using a fiber fabric impregnated with a cured binding agent, the look produced also permanently meets very high aesthetic demands.

In one embodiment, the fiber fabric within the covering layer is displaced off-center and, for example, in the direction of the main body in relation to the thickness of the covering layer. In this way, the fiber fabric may be disposed at or near a surface of the covering layer facing the main body. An additional, comparatively thin layer of cured binding agent, with which the fiber fabric is impregnated, for example, having a thickness of less than 0.3 mm, in particular, less than 0.2 mm and preferably less than 0.1 mm, may be disposed between the fiber fabric and the surface of the main body. A further improvement in the resistance of the surface of the sanitary basin molded part relative to hot/cold stresses is achieved by that sandwich structure. As an alternative, the fiber fabric may also be displaced from the center of the covering layer in the direction of the surface of the sanitary basin molded part.

In one embodiment, the thickness of the fiber fabric is less than 20%, in particular, less than 15% and preferably less than 10% of the thickness of the main body. The thickness of the fiber fabric may be less than 60%, in particular, less than 50% and preferably less than 40% of the thickness of the covering layer. In one embodiment, the thickness of the fiber fabric is, for example, between 0.3 and 0.7 mm, whereas the entire thickness of the covering layer is more than 1 mm and less than 2 mm. The thickness of the main body may be more than 7 mm and less than 14 mm, in particular, more than 8 mm and less than 12 mm.

The comparatively low thickness of the fiber fabric is sufficient to ensure resisting the tensions occurring, in particular, laterally in relation to the surface in the event of hot/cold stress.

In one embodiment, the covering layer on the visible side of the sanitary basin molded part includes a water-repellant layer, for example, a thin covering layer made of a polyester resin. This layer ensures that water is permanently prevented from penetrating into the covering layer.

The glass transition temperature and, preferably also, the Martens temperature of the covering layer may be comparatively low with respect to the underlying main body, for example, merely higher than 80° C.

In one embodiment, the fiber fabric of the covering layer includes carbon fibers. In particular, the fiber fabric is made of carbon fibers. In this case, fiber bundles or rovings may be woven together to form a fabric fiber, wherein the warp fiber rovings and the weft fiber rovings form an angle of essentially 90°. A twill fabric has proven especially advantageous as a weave for sanitary molded parts. The warp thread rovings and the weft thread rovings extend preferably parallel or in a direction transverse to the longitudinal direction of the sanitary basin molded part. Studies have shown that resistance to stress cracks is particularly high, in particular, in a fiber fabric of this type.

In one embodiment, the mass per unit area of the fiber fabric is greater than 50 g/m2 and less than 400 g/m2, in particular, greater than 80 g/m2 and less than 350 g/m2 and preferably greater than 100 g/m2 and less than 300 g/m2. The rovings preferably have a width of greater than 0.5 mm and less than 5 mm, in particular, greater than 0.7 mm and less than 3.5 mm and preferably greater than 1.0 mm and less than 2.0 mm. In one embodiment, the fiber fabric is a spread tow fabric, with either a twill weave or a canvas weave. The width of the fiber strand in warp and/or weft in this case is greater than 5 mm and less than 15 mm, in particular, greater than 6 mm and less than 12 mm.

The invention also relates to a method for manufacturing a sanitary basin molded part, such as, for example, a kitchen sink, a wash basin or a shower tray, having a main body in the shape of the sanitary basin molded part and providing the mechanical stability of the sanitary basin molded part. A covering layer is disposed on the visible side of the sanitary basin molded part on top of the main body. The covering layer comprises a fiber fabric impregnated with a cured binding agent.

The main body may be manufactured from a composite material comprising a polymerized, cured binding agent and embedded with fillers as described above. In one embodiment, the main body and the covering layer are manufactured separately. The covering layer, in this case in the form of a cover shell, may then be connected to the main body in a fixed and non-detachable manner by attaching the covering layer to the surface of the main body corresponding to the visible side of the sanitary basin molded part and connected to the main body. For example, the connection may be made using epoxy glue, in particular, a two-component epoxy glue.

The covering layer may be subject to compressive stress either already during manufacture of the covering layer or when attaching the covering layer to the main body. This compressive stress can be achieved, for example, either by applying a temperature higher than room temperature during manufacture of the covering layer or when connecting the covering layer to the main body. The covering layer then becomes compressively stressed during subsequent cooling due to different thermal expansion coefficients of the covering layer on the one hand and the main body on the other hand.

This stressing is, in particular, the case when using carbon fibers for the covering layer, since carbon fibers exhibit, at least regionally, a negative thermal expansion coefficient. The carbon fibers lengthen during cooling, whereas the binding agent, with which the carbon fibers are impregnated, may shrink during cooling. The same applies to the main body, which also shrinks during cooling. In particular when using carbon fibers for the fiber fabric, compressive stresses are then introduced into the covering layer during the manufacturing process of the sanitary basin molded part, in particular, in the resin layer situated above the fiber fabric, which reliably prevents stress cracks from occurring during subsequent use.

In one embodiment, the main body is manufactured by molding a molded part, in particular, by cast molding. In this way, the manufacture main bodies can have high material homogeneity, and thus, have good mechanical properties, in particular, those manufactured from a composite material.

In one embodiment, the fiber fabric may be inlaid in the portion of the molded part forming the visible side of the sanitary basin molded part. The covering layer may also be inlaid in the molded part as a prepreg in the manner of a semi-finished product. As an alternative, the fiber fabric impregnated with the binding agent may exist as a prepreg and be connected to the previously finished main body in one molded part by heating the molded part until the prepreg cures and is optionally also already connected to the main body. In this case, a molded part may be used for the curing of the prepreg, which has the same shape as the molded part with which the main body is manufactured.

The features mentioned in the claims and in the description may be essential to the invention, each individually or in any combination.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a side view in section through a sanitary basin molded part according to an exemplary embodiment of the invention, viewed in the direction of its longitudinal axis;

FIG. 2 is an enlarged, side view in section of a detail of the sanitary basin molded part of FIG. 1 in the area of the drain board; and FIG. 3 is a top view of the surface of the sanitary basin molded part of FIG. 1.

DETAILED DESCRIPTION OF THE INVENTION

FIG. 1 shows a section through an exemplary embodiment of a sanitary basin molded part 1 according to the invention in the direction of its longitudinal axis. The exemplary embodiment is a built-in kitchen sink comprising a basin 2 and a drain board 4. FIG. 2 shows an enlarged representation of a detail of the sanitary basin molded part 1 in the area of the drain board 4.

The sanitary basin molded part 1 has a main body 10 fully shaped as, and providing the mechanical stability of, the sanitary basin molded part 1, which in the exemplary embodiment is manufactured from a composite material. The composite material is formed from a cured acrylic resin embedded with particulate fillers made of SiO2. The proportion of the SiO2 filler is greater than 65% and less than 75% by weight relative to the total mass of the main body, which is 8 kg in the exemplary embodiment. The thickness 12 of the main body 10 in this case is 10 mm.

A covering layer 20 is disposed on top of the main body 10 on the surface 30 and forms the visible side of the sanitary basin molded part 1. Covering layer 20 comprises a fiber fabric 24 impregnated with a cured binding agent 22. The fiber fabric 24 in this embodiment is disposed at or near the surface of the covering layer 20 facing the main body 10. A thin layer of the binding agent 22 extends between the fiber fabric 24 and the main body 10, so that the covering layer 20 has a surface closed by the binding agent 22, even on its surface facing the main body 10. This structure ensures that a stabilizing effect emanating from the fiber fabric 24 is fully introduced via the binding agent 22 into the covering layer 20. The fiber fabric 24 is formed from carbon fibers. The weave is twill. The mass per unit area in the exemplary embodiment is greater than 100 g/m2 and less than 250 g/m2. The binding agent is an epoxy resin. The Martens temperature is higher than 80° C.

Above the fiber fabric 24, the covering layer 20 includes a top layer 26 in the direction of the surface 30 of the sanitary basin molded part 1. The top layer 26 may also be made of a cured polymerized resin, for example, of an epoxy resin or a polyester resin. At the surface, the covering layer 20 includes a water-repellant layer 28, which forms the surface 30 of the covering layer 20. Therefore, the surface of the sanitary basin molded part 1 is covered as well. The water-repellant layer 28 may also be omitted when using suitable resins for the top layer 26, for example, polyester resin. In one embodiment, the covering layer 20 includes a fiber fabric 24 impregnated with epoxy resin and a top layer 26 made of polyester resin.

The thickness of the covering layer 20 in the exemplary embodiment is approximately 1.5 mm. The proportion 32 of the top layer 26 to the thickness of the covering layer 20 is approximately 1 mm. The proportion 34 of the fiber fabric 24 impregnated with the binding agent to the thickness of the covering layer 20 is approximately 0.5 mm.

FIG. 3 shows a top view of the surface 30 of the sanitary basin molded part 1. In one exemplary embodiment, the top layer 26, and preferably also the binding agent 22, with which the fiber fabric 24 is impregnated, is transparent or at least translucent. The orientation of the fiber fabric 24 is then visible on the surface 30. When using carbon fibers for the fiber fabric 24, in particular, the result is aesthetically high-quality light reflexes and a 3D-effect due to the non-planar orientation of the warp thread rovings 36 and the weft thread rovings 38 within the fiber fabric 24, in particular, when using the twill weave for the fiber fabric 24. This structure is enhanced still further by the thickness 32 of the top layer 26 and its refractive index.

The arrangement of the fabric fiber 24, asymmetrical in relation to the thickness of the covering layer 20, also results in the occurrence of compressive stresses, in particular at the surface 30, which effectively counteract the formation of stress cracks.

While one embodiment has been chosen to illustrate the invention, it will be understood by those skilled in the art that various changes and modifications can be made therein without departing from the scope of the invention as defined in the claims.

What is claimed:

1. A sanitary basin, comprising:
a molded part being in a shape of the sanitary basin and having a main body with a top visible surface area; and
a covering layer on said top visible surface area of the main body, said covering layer including a fiber fabric impregnated with a cured binding agent and a top layer and providing mechanical stability to said main body, said fiber fabric having woven rovings with warp and weft fibers forming an angle of essentially 90 degrees therebetween, said top layer and said binding agent being at least one of transparent or translucent capable of allowing an orientation of said fiber fabric to be visible on an exposed surface of said top layer.

2. A sanitary basin according to claim 1 wherein said sanitary basin is one of a kitchen sink, a wash basin or a shower tray.

3. A sanitary basin according to claim 1 wherein said main body is formed of a composite material including a polymerized cured bonding agent embedded with fibers.

4. A sanitary basin according to claim 1 wherein said covering layer extends over an entire surface of said main body on a visible side of said main body.

5. A sanitary basin according to claim 1 wherein said covering layer has a thickness less than 35 percent of a thickness of said main body.

6. A sanitary basin according to claim 1 wherein said covering layer has a thickness less than 30 percent of a thickness of said main body.

7. A sanitary basin according to claim 1 wherein said covering layer has a thickness less than 25 percent of a thickness of said main body.

8. A sanitary basin according to claim 1 wherein said fiber fabric is offset from a center of a thickness of said covering layer.

9. A sanitary basin according to claim 1 wherein said fiber fabric has a thickness less than 20 percent of a thickness of said main body.

10. A sanitary basin according to claim 1 wherein said fiber fabric has a thickness less than 15 percent of a thickness of said main body.

11. A sanitary basin according to claim 1 wherein said fiber fabric has a thickness less than 10 percent of a thickness of said main body.

12. A sanitary basin according to claim 1 wherein said covering layer comprises a water-repellant layer on a visible side of said covering layer.

13. A sanitary basin according to claim 1 wherein said fiber fabric comprises carbon fibers.

14. A sanitary basin according to claim 1 wherein said fiber fabric consists of carbon fibers.

\* \* \* \* \*